US008617450B2

(12) United States Patent
Marchini et al.

(10) Patent No.: US 8,617,450 B2
(45) Date of Patent: Dec. 31, 2013

(54) METHOD AND APPARATUS FOR THE VULCANISATION OF TYRES FOR VEHICLE WHEELS

(75) Inventors: Maurizio Marchini, Milan (IT); Fiorenzo Mariani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 161 days.

(21) Appl. No.: 11/988,876

(22) PCT Filed: Jul. 29, 2005

(86) PCT No.: PCT/IT2005/000461
§ 371 (c)(1),
(2), (4) Date: Jan. 16, 2008

(87) PCT Pub. No.: WO2007/013113
PCT Pub. Date: Feb. 1, 2007

(65) Prior Publication Data
US 2009/0101270 A1    Apr. 23, 2009

(51) Int. Cl.
*B29C 35/00*        (2006.01)

(52) U.S. Cl.
USPC ....... 264/326; 264/297.5; 264/501; 425/34.1; 425/44

(58) Field of Classification Search
USPC ............. 264/326, 501, 297.5; 425/34.1, 34.3, 425/35, 38, 40, 41, 42, 44; 156/111
See application file for complete search history.

(56) References Cited

U.S. PATENT DOCUMENTS

| | | | | |
|---|---|---|---|---|
| 4,728,274 A | * | 3/1988 | Siegenthaler | 425/34.1 |
| 5,384,084 A | * | 1/1995 | Siegenthaler | 264/237 |
| 5,622,669 A | | 4/1997 | Dailliez et al. | |
| 5,656,303 A | * | 8/1997 | Takagi | 425/34.1 |
| 6,322,342 B1 | * | 11/2001 | Mitamura | 425/28.1 |
| 6,921,446 B2 | * | 7/2005 | Takagi | 156/111 |

FOREIGN PATENT DOCUMENTS

| | | |
|---|---|---|
| EP | 0 578 104 A2 | 1/1994 |
| EP | 0 976 533 A2 | 2/2000 |
| EP | 1 066 952 A1 | 1/2001 |
| EP | 1 150 829 B1 | 3/2003 |
| JP | 2001-47439 | 2/2001 |
| WO | WO-03/092988 A1 | 11/2003 |
| WO | WO-2004/045837 A1 | 6/2004 |
| WO | WO 2004045837 A1 * | 6/2004 |

* cited by examiner

*Primary Examiner* — William Bell
(74) *Attorney, Agent, or Firm* — Finnegan, Henderson, Farabow, Garrett & Dunner, L.L.P.

(57) ABSTRACT

A vulcanisation apparatus and method for tires for vehicle wheels includes the steps of: placing a green tire, arranged on a toroidal support, inside a vulcanisation mold; connecting a supply device of at least one pressurised primary working fluid and a supply device of at least one pressurised secondary working fluid to the vulcanisation mold in a prevulcanisation and molding station; at least partially vulcanising a radially internal portion of the green tire on the toroidal support; transferring the mold to a vulcanisation station and completing the vulcanisation of the prevulcanised tire by supplying the at least one pressurised primary working fluid inside the toroidal support.

42 Claims, 4 Drawing Sheets

METHOD AND APPARATUS FOR THE VULCANISATION OF TYRES FOR VEHICLE WHEELS

CROSS REFERENCE TO RELATED APPLICATION

This application is a national phase application based on PCT/IT2005/000461, filed Jul. 29, 2005, the content of which is incorporated herein by reference.

BACKGROUND OF THE INVENTION

The present invention relates to a method and an apparatus for the vulcanisation of tyres for vehicle wheels.

In particular, the present invention relates to method and apparatus for the vulcanisation of tyres built on a toroidal support.

TECHNICAL STATE OF THE ART

The tyre production cycle provides that, following a building process wherein the different components of the tyre are made and/or assembled, a molding and vulcanisation process is carried out which aims at defining the tyre structure, according to a desired geometry and tread pattern.

For this purpose, the tyre is closed inside a molding cavity, having a suitable configuration, defined internally of a vulcanisation mold and shaped according to the requirements of the tyre to be obtained.

A tyre generally comprises a toroidally ring-shaped carcass including one or more carcass plies, strengthened with reinforcing cords, lying in substantially radial planes, (a radial plane contains the rotation axis of the tyre). Each carcass ply has its ends integrally associated with at least one metal annular reinforcing structure, usually known as bead core, constituting the reinforcing at the beads, i.e. at the radially internal ends of the tyre, the function of which is to enable assembling of the tyre with a corresponding mounting rim. Placed crown wise to said carcass is a band of elastomer material, called tread band, in which, at the end of the vulcanisation and molding steps, a raised pattern is formed for ground contact. A reinforcing structure usually known as belt structure is placed between the carcass and the tread band. In the case of car tyres, this structure usually comprises at least two radially superposed strips of rubberised fabric provided with reinforcing cords, generally of metal material, positioned parallel to each other in each strip and in a crossed relationship with the cords of the adjacent strip preferably symmetrically arranged with respect to the equatorial plane of the tyre. Preferably said belt structure further comprises at a radially external position thereof, at least on the ends of the underlying strips, also a third layer of textile or metallic cords, circumferentially disposed (at 0 degrees).

Finally, in tyres of the tubeless type, i e. devoid of an air tube, a radially internal layer, called liner, is present which has imperviousness features to ensure the air-tightness of the tyre.

To the aims of the present description as well as in the following claims, by the term "elastomer material" it is intended a composition comprising at least one elastomer polymer and at least one reinforcing filler. Preferably this composition further comprises additives such as cross-linking and/or plasticizing agents. By virtue of the cross-linking agents, this material can be cross-linked through heating so as to form the final manufactured article.

EP 1 066 952 A1 describes a method and an apparatus for the vulcanisation of tyres. More precisely, a plurality of lines of vulcanisation stations which contain a plurality of series of mobile tyre mold units for tyre vulcanisation is disclosed; a mold opening/closing station through which the vulcanised tyre is removed, and a green tyre is inserted; a first mold transferring device and a second mold transferring device positioned between the mold opening/closing station and the tyre vulcanisation station for the transfer of the tyre mold units.

There are molding and curing methods in which a green tyre put on a rigid toroidal support is arranged within the mold. Said methods are preferably employed for tyres which, according to recent building processes, are produced starting from a limited number of elementary semifinished products fed onto a toroidal support whose outer profile coincides with that of the radially internal surface of the tyre that is wished to be produced. Said toroidal support is moved, preferably by means of a robotized system, among a plurality of workstations in each of which, through automated sequences, a particular building step of the tyre is carried out.

For example, the European Patent Application published under N° 0 976 533, in the name of the same Applicant, discloses a method and an apparatus for molding and. curing tyres for vehicle wheels of the aforesaid type, wherein a green tyre built on a toroidal support is closed inside a vulcanisation mold; subsequently steam or other pressurised fluid is fed into at least one gap for fluid diffusion created between the external surface of the toroidal support and the internal surface of the tyre.

In these cases, at the end of the molding and vulcanisation steps, the tyre thus obtained may sometimes exhibit some faults. Because of the absence of the vulcanisation bladder, the various components of the elastomer material which are still in an uncured state, i.e. in a plastic state, may be displaced in an anomalous manner with respect to the design specifications, as a result of the thrust exercised by the pressurised working fluid introduced between the external surface of the toroidal support and the internal surface of the green tyre. In particular, the carcass ply or plies can move away and slip out from their position in the bead region because of the expansion to which the tyre is subjected by said working fluid. In this way, the tensioning of the carcass ply or plies determined by the molding step is lower than it is provided to be for the finished tyre.

In order to overcome these drawbacks the International Patent Application published under No. WO 2004/045837, in the name of the same Applicant, discloses a method and an apparatus which, by pressing the green tyre from the outside towards the inside, and simultaneously supplying heat to the internal surface of the said tyre, at least a partial vulcanisation of the radially innermost layer of the tyre and of the bead region is obtained, so that a molding and vulcanisation step, which does not result in irregularities or lack of homogeneity in the finished tyre, can be subsequently performed.

In order to carry out said partial vulcanisation, at least a pressurised primary working fluid, suitably heated to supply the heat necessary for the aforesaid partial vulcanisation, and at least a pressurised secondary working fluid are preferably used. The Applicant has perceived that for this reason the apparatuses necessary for accomplishing said partial vulcanisation are provided with multiple connectors for said working fluids and that therefore they results as being complex and expensive.

The Applicant has also ascertained that said connectors are present on each work station, that is, at each mold of the vulcanisation apparatus, even though they are used only during the prevulcanisation step and therefore they are not used for most of the vulcanisation method.

In a similar manner, the Applicant has found the presence of further components present in the vulcanisation apparatus which are used only during some of the tyre vulcanisation steps, which therefore result unused for a quite long period of time. An example of this kind of apparatus is the heating device of the vulcanisation mold used only during the tyre vulcanisation step.

The Applicant has noted that by providing a vulcanisation apparatus which realises a vulcanisation method of the type shown in patent N° WO 2004/045837, it is possible to simplify and reduce the cost of the aforesaid apparatus, by reducing the number of the more expensive components (for example, those related to the supply of the secondary working fluid and/or those concerning the heating of the mold), while maintaining constant the productive capacity of the same vulcanisation apparatus, by means of a rational use of said apparatuses, increasing the operating time thereof in the vulcanisation cycle.

Therefore the object of the present invention is to provide a vulcanisation method for vehicle wheel tyres which allows to achieve the maximum utilisation degree of the devices associated with each work station while the same method is carried out.

Another object of the present invention is to provide a vulcanisation apparatus for vehicle wheel tyres built on a toroidal support provided with a plurality of work stations, each one being provided with the minimum number of devices required for the specific operation to be performed, in order to reduce the costs for carrying out the apparatus.

SUMMARY OF THE INVENTION

The Applicant has found that by carrying out a vulcanisation method which uses at least one prevulcanisation and molding work station wherein, both a prevulcanisation of the radially internal portion of the tyre and a molding and a partial vulcanisation of the whole tyre are carried out in subsequent steps, and at least one vulcanisation work station wherein the remaining part of the vulcanisation of the whole tyre is carried out, it is possible to retain at the single prevulcanisation and molding station, the apparatuses necessary for supplying the abovesaid primary and secondary working fluids, while maintaining only the apparatuses for supplying the primary working fluid at the vulcanisation stations, thus obtaining the maximum utilisation degree of the devices available during the same method.

According to a first aspect, the invention relates to a vulcanisation method for vehicle wheel tyres comprising the following steps:

a) placing a green tyre, arranged on a toroidal support, inside a vulcanisation mold which may be operably associated with a plurality of work stations defined in at least one vulcanisation module;

b) closing said vulcanisation mold;

c) connecting a supplying device of at least one pressurised primary working fluid and a supplying device of at least one pressurised secondary working fluid to the vulcanisation mold in a prevulcanisation and molding station;

d) at least partially vulcanising a radially internal portion of the green tyre on the toroidal support by the pressing by means of said pressurised secondary working fluid a radially internal surface of said green tyre towards an external surface of the toroidal support, and supplying heat to said portion of the tyre;

e) molding and continuing the vulcanisation of the aforesaid tyre by supplying at least one pressurised primary working fluid inside the toroidal support pressing a radially external surface of the green tyre towards the internal walls of the vulcanisation mold;

f) disconnecting from the vulcanisation mold the supplying device of said at least one pressurised primary working fluid and the supplying device of said at least one pressurised secondary working fluid;

g) transferring the mold to a vulcanisation station;

h) connecting a respective supplying device of at least one pressurised primary working fluid to the vulcanisation mold in said vulcanisation station;

i) completing the vulcanisation of the tyre molded and prevulcanised during steps d) and e), supplying said at least one pressurised primary working fluid inside the toroidal support, pressing a radially external surface of the green tyre towards the internal walls of the vulcanisation mold and supplying heat to the aforesaid tyre;

j) disconnecting the supplying device of said at least one pressurised primary working fluid;

k) opening the mold and the unloading of the molded and vulcanised tyre from the vulcanisation mold.

The Applicant has further verified that during vulcanisation processes of the type described in WO 2004/045837 the prevulcanisation step wherein the tyre is pressed from the exterior towards the external surface of the toroidal support, in order to obtain through a suitable quantity of heat, at least a partial vulcanisation of the radially internal portion of the tyre (for example of the liner) and of the bead region, has for each tyre model a pre-established execution time which is possibly not able to be divided in subsequent sub-steps. This is due to the fact that because if the tyre, still substantially in a green state, is subject to manipulation and/or interruptions during the aforesaid step, it could has irregularities at the end of the molding and vulcanisation steps caused by unexpected slipping of some layers of elastomer material.

The Applicant has therefore noted that the technological limit of maximum efficiency of the vulcanisation method and apparatus necessary for carrying out said method, lies substantially in the duration of the prevulcanisation step, therefore, carrying out a vulcanisation method in such a way that the actual vulcanisation step has a duration that substantially coincides with a multiple time of the duration time of the prevulcanisation step, it is possible to maximise the efficiency of the aforesaid method.

According to a preferred embodiment the vulcanisation method according to the present invention provides therefore that, being the total time required to carry out steps h)+i) +j) equal to t1, and being the total time required to carry out steps k)+a)+b)+c)+d) +e)+f) equal to t2, it is substantially t1=m*t2, where m is a whole number greater than or equal to 1.

It should be noted that in the present description and in the following claims, the duration of two times is considered "substantially" equal when the difference between them is inferior to a prime minute.

According to a second aspect the invention relates to a vulcanisation apparatus for vehicle wheel tyres comprising at least one vulcanisation module wherein is defined a plurality of work stations whereto a plurality of vulcanisation molds, each one containing a green tyre being processed arranged on a respective toroidal support, may be operably associated, said vulcanisation module comprising the following work stations:

at least one prevulcanisation and molding station provided with a supplying device of at least one pressurised primary work fluid and with a supplying device of at least one pressurised secondary work fluid inside one vulcanisation mold located in said station, said pressurised secondary work fluid being adapted to press a radially internal surface of said green tyre towards an external surface of the toroidal support, said pressurised primary work fluid being adapted to press a radially external surface of a green tyre towards the internal walls of the vulcanisation mold;

at least one vulcanisation station provided with a respective supplying device of said at least one pressurised primary work fluid inside one vulcanisation mold located in said station, said pressurised primary work fluid being adapted to press said radially external Surface of a green tyre towards the internal walls of the vulcanisation mold in order to complete the vulcanisation of the molded and partially vulcanised tyre;

at least one transfer device adapted to sequentially transfer, each vulcanisation mold of said plurality of molds from one work station to the subsequent one;

at least one moving device adapted to pick up a vulcanised tyre arranged on the toroidal support from said at least one vulcanisation module and to place a green tyre positioned on a respective toroidal support in said at least one vulcanisation module;

at least one mold opening and closing device for the unloading of a vulcanised tyre and the subsequential loading of a green tyre inside a vulcanisation mold.

BRIEF DESCRIPTION OF THE FIGURES

Further characteristics and advantages of the invention will be more apparent from the following description of some preferred embodiments of apparatuses and methods of vulcanisation methods according to the invention, provided as a non-limiting example, with reference to the appended drawings, wherein.

DETAILED DESCRIPTION OF THE PREFERRED EMBODIMENTS

With reference to FIGS. 1-4, by reference numeral 1 has been generally identified a vulcanisation apparatus for vehicle wheel tyres according to the present invention. The apparatus 1 comprises at least one vulcanisation module 2, preferably a couple of vulcanisation modules 2, wherein a plurality of work stations such as prevulcanisation and molding stations 3, vulcanisation stations 3', and loading and unloading stations 3" is defined. Said work stations are immovable stations and are adapted to house movable vulcanisation molds 4 during the different steps of the vulcanisation method according to the present invention.

In particular, at each work station may be associated a vulcanisation mold 4 containing a green tyre being processed during a step of the vulcanisation method.

The vulcanisation molds 4 are preferably airtight and are adapted to house a tyre being processed previously arranged or built on a toroidal support, whose external surface substantially reproduces the internal conformation of the tyre to be obtained. Said vulcanisation molds 4 are provided with devices for passage of working fluids as illustrated for example in the International Patent application published under No. WO 2004/045837, in the name of the same Applicant, which is hereby integrally incorporated by reference.

Each vulcanisation module 2 comprises at least one prevulcanisation and molding station 3 and at least one vulcanisation stations 3'.

Said prevulcanisation and molding station 3 is provided with a supplying device of at least one pressurised primary working fluid, preferably heated, and with a supplying device of at least one pressurised secondary working fluid inside the vulcanisation mold 4 temporarily located in the same prevulcanisation and molding station 3.

The pressurised secondary working fluid preferably comprises air, nitrogen or other substantially inert gases, and is adapted to press a radially internal surface of said green tyre towards an external surface of the toroidal support; the pressurised primary working fluid preferably comprises steam and nitrogen or other substantially inert gases, and is adapted to press a radially external surface of the green tyre towards the internal walls of the vulcanisation mold. Said primary and secondary working fluids cooperate in order to carry out a prevulcanisation of the tyre as illustrated in the aforesaid application WO 2004/045837.

In the present description and in the following claims, the term prevulcanisation refers to at least a partial vulcanisation of the radially innermost layer of the tyre and of the bead region.

Whiled the vulcanisation station 3', is provided only with the supplying devices of at least one pressurised primary work fluid, preferably heated, inside the vulcanisation mold temporarily located in the same vulcanisation station 3'.

The pressurised primary working fluid preferably comprises steam or and nitrogen or other substantially inert gases and is adapted to press said radially external surface of the green tyre towards the internal walls of the vulcanisation mold 4 in order to complete the vulcanisation of the tyre molded and partially vulcanised in the prevulcanisation and molding station 3.

Preferably, the supplying device of said at least one pressurised primary working fluid and the supplying device of said at least one pressurised secondary working fluid of the prevulcanisation and molding station 3 and the supplying device of said at least one pressurised primary working fluid of the vulcanisation station 3' comprise advantageously at least one quick snap-on clutch adapted to rapidly connect the fluid supplying device to the vulcanisation mold 4.

Each mold 4 includes advantageously at least one airtight connector adapted to keep the pressure of said at least one primary working fluid constant inside the mold when the quick snap-on clutch of the supplying device of said pressurised primary working fluid is disconnected.

Each vulcanisation module 2 is further provided with at least one transfer device 5 adapted to transfer each vulcanisation mold 4 from one work station to the subsequent one. Preferably, said at least one transfer device 5 of the vulcanisation molds 4 comprises at least one conveyor belt, not shown in FIG. 1, which is adapted to transfer each vulcanisation mold 4 at the work station wherein the specific operative step to which the tyre has to be subjected is carried out.

Said at least one conveyor belt acts also as a support for said vulcanisation molds 4 which are removably connected thereto.

Alternatively, the aforesaid at least one transfer device 5 may comprise a turntable which may be driven in rotation in order to move each vulcanisation mold 4 at each of the aforesaid work stations.

Figure 4:
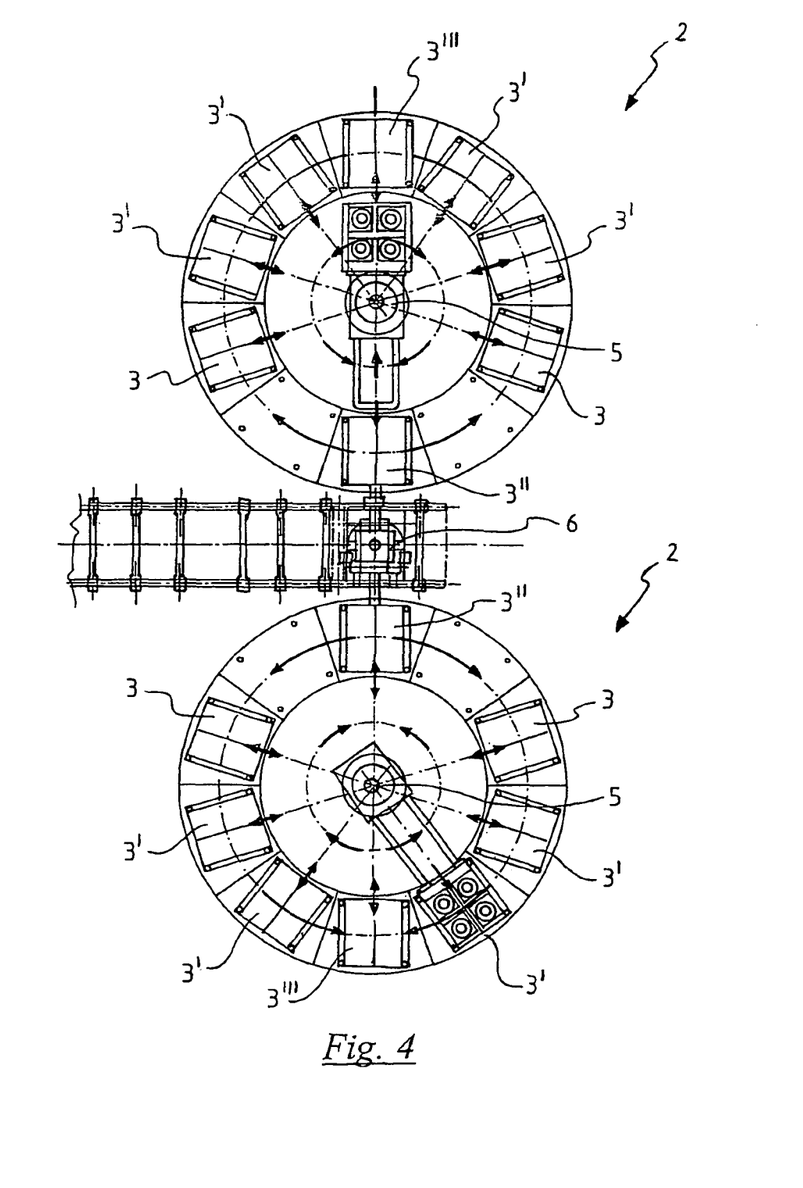
FIG. 4 shows a plan schematic view of a vulcanisation apparatus for tyres for vehicle wheels according to an alternative embodiment of the invention during a step of the method in question.

In a further preferred embodiment and with reference to FIG. 4 it can be seen that said at least one transfer device 5 may comprise a rotating arm adapted to pick up each vulcanisation mold 4 from one work station to transfer it to the subsequent one.

According to the present invention, each vulcanisation module 2 is operably associated with at least one moving device 6, adapted to pick up from the same vulcanisation module 2 a vulcanised tyre arranged on a respective toroidal support, and to place in the same vulcanisation module 2 a green tyre previously built on a respective toroidal support. Preferably a single moving device 6 is associated with several vulcanisation modules 2, as shown in FIG. 4. In a preferred embodiment, the moving device 6 may comprise at least one robotised arm, for example, such as the type described in the European Patent EP 1 150 829 in the name of the same Applicant, in case with the addition of auxiliary moving devices.

Each vulcanisation module 2 is also provided with at least one mold opening and closing device adapted to open each vulcanisation mold 4 in order to allow the unloading of the vulcanised tyre and the loading of the green tyre and then the closing of the same mold 4.

Preferably, said mold opening and closing device is integrated in said prevulcanisation and molding station 3. Alternatively it may also be external with respect to the aforesaid station.

The present invention provides that the mold opening and closing device cooperate with the moving device 6 in such a way that when the vulcanisation mold 4 is opened by the opening and closing device, the moving device 6 picks up the toroidal support with the vulcanised tyre from the vulcanisation module 2 and places the toroidal support with the green tyre on the same vulcanisation module 2.

Figure 1:
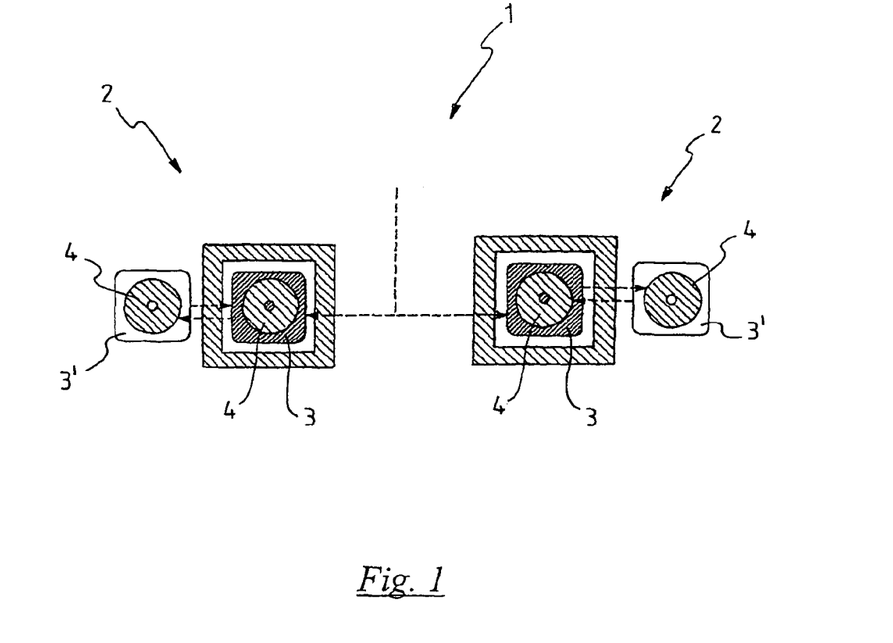
FIG. 1 shows a plan schematic view of a vulcanisation apparatus for tyres for vehicle wheels according to a preferred embodiment of the invention during a step of the method in question.

According to a first embodiment, schematically shown in FIG. 1, the vulcanisation apparatus 1 comprises two vulcanisation modules 2 and, for each vulcanisation module 2, a single prevulcanisation and molding station 3, and a single vulcanisation station 3'.

Figure 2:
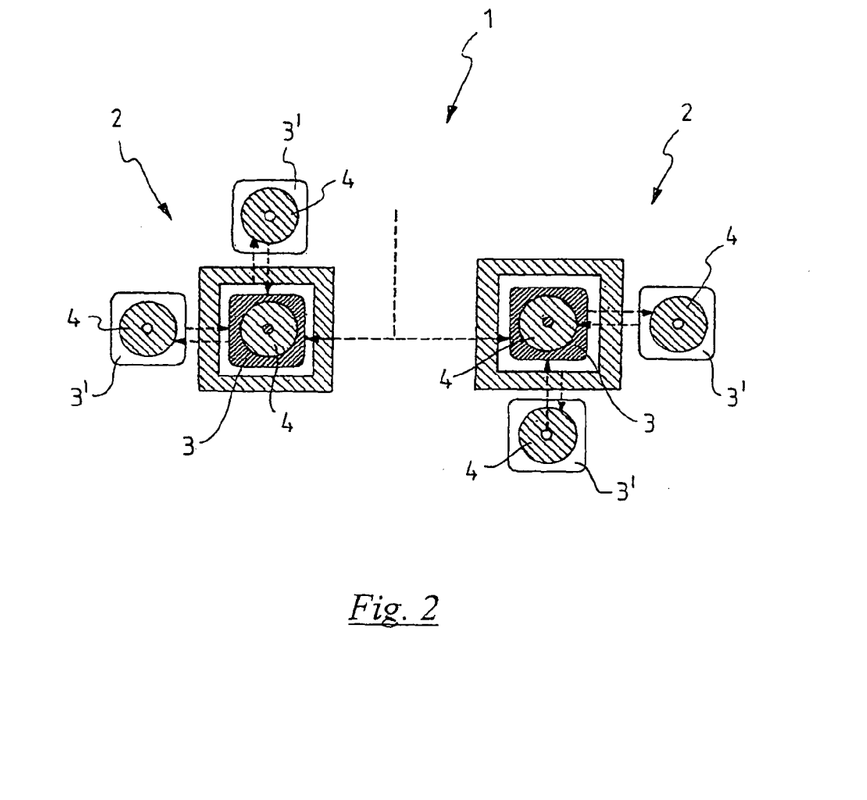
FIG. 2 shows a plan schematic view of a vulcanisation apparatus for tyres for vehicle wheels according to a second embodiment of the invention during a step of the method in question.

In a second embodiment, schematically shown in FIG. 2, the vulcanisation apparatus 1 comprises two vulcanisation modules 2 but, in each vulcanisation module 2, are present a prevulcanisation and molding station 3 and two vulcanisation stations 3'.

Figure 3:
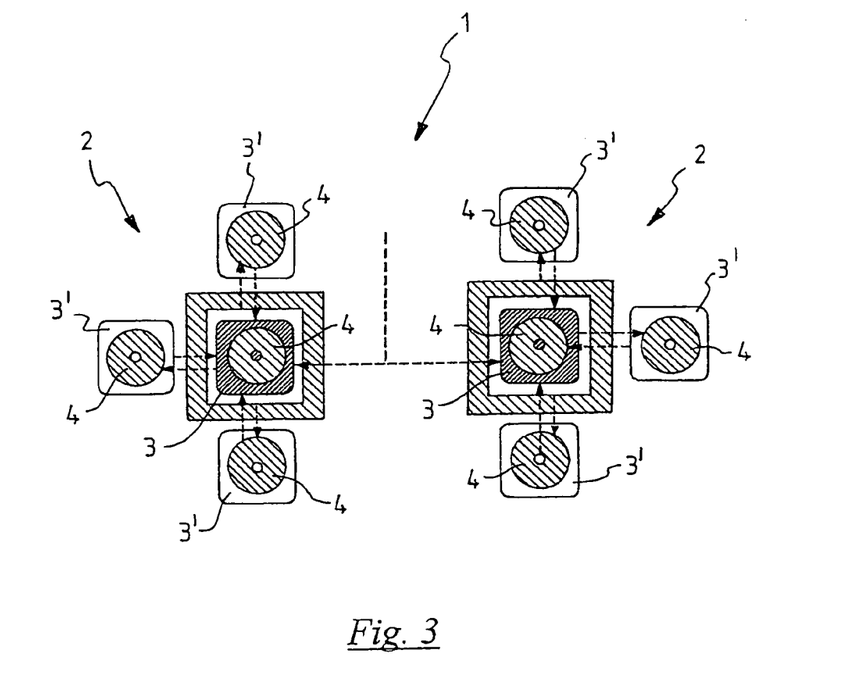
FIG. 3 shows a plan schematic view of a vulcanisation apparatus for tyres for vehicle wheels according to a third embodiment of the invention during a step of the method in question.

Analogously, in a third embodiment, schematically shown in FIG. 3, the vulcanisation apparatus 1 comprises two vulcanisation modules 2 but, in each vulcanisation module 2, are present one prevulcanisation and molding station 3 and three vulcanisation stations 3'.

According to a fourth embodiment, schematically shown in FIG. 4, the vulcanisation apparatus 1 comprises two vulcanisation modules 2, each of which is provided with two prevulcanisation and molding stations 3, and four vulcanisation stations 3'. In this embodiment two loading and unloading stations 3", wherein the unloading of the vulcanised tyres and the loading of the green tyres are performed, are provided. The transfer devices 5 comprise a rotating arm adapted to transfer each vulcanisation mold 4 from one work station to the subsequent one.

According to a fourth embodiment, schematically shown in FIG. 4, the vulcanisation apparatus 1 comprises two vulcanisation modules 2, each of which is provided with two prevulcanisation and molding stations 2, and four vulcanisation stations 3'. In this embodiment two loading and unloading stations 3", wherein the unloading of the vulcanised tyres and the loading of the green tyres are performed, are provided. The transfer devices 5 comprise a rotating arm adapted to transfer each vulcanisation mold 4 from one work station to the subsequent one.

In the first three embodiments the tyre loading and unloading operations are carried out in the prevulcanisation and molding stations 3 and therefore no specific loading and unloading stations 3" have been provided, that is the mold opening and closing device is, in this case, integrated in the prevulcanisation and molding station 3.

Preferably, the number of the vulcanisation stations 3' present in each vulcanisation module 2 is comprised between 2 and 4. In this manner, in fact, it is possible to obtain the maximum efficiency of the apparatus, because, as mentioned previously, the prevulcanisation step which cannot be divided into sub-steps, has a duration period that is far shorter than that of the vulcanisation step. With 2 to 4 vulcanisation stations 3' available for each module 2 and therefore for each prevulcanisation station 3, it is possible to obtain the maximum efficiency of all the elements of the vulcanisation apparatus, as it will be explained in more detail in the following.

Optionally, each vulcanisation station 3' may be provided with heating devices of the vulcanisation molds 4.

Also the prevulcanisation and molding station 3 can be optionally provided with heating devices of the vulcanisation molds 4.

Said heating devices of the vulcanisation molds 4 in the prevulcanisation and molding station 3 and in the vulcanisation station 3' may be associated with said supplying device of said pressurised primary fluid. In particular, the primary working fluid may be used to heat the vulcanisation mold 4. Alternatively, electric resistors may be provided for this purpose.

Each vulcanisation module 2 may be provided with mold change stations 3''', as shown in FIG. 4. Said mold change stations 3''' are adapted to allow the replacement of the vulcanisation mold 4 according to manufacture needs, for example in case of variation of the size of the tyre to be vulcanised.

In different alternative solutions, such as those shown in FIGS. 1, 2 and 3, for example, the mold change station (in these cases not shown), may coincide with one of the prevulcanisation stations 3 or vulcanisation stations 3' or may be positioned adjacent to one of said stations according to the required layout of the vulcanisation apparatus 1.

With reference to the vulcanisation apparatus 1 shown in FIGS. 1-4, a description of a preferred embodiment of a vulcanisation method according to the invention will be now disclosed. According to a first step, a green tyre, arranged or built on a respective toroidal support, is placed inside a vulcanisation mold 4 which may be operably associated with the plurality of work stations defined in said at least one vulcanisation module 2 of the vulcanisation apparatus 1. Afterwards, the vulcanisation mold 4 is closed, preferably by means of said mold opening and closing devices.

Then the step of connecting a supplying device of the pressurised primary work fluid, preferably heated, and a supplying device of the pressurised secondary work fluid to the vulcanisation mold 4 at the prevulcanisation and molding station 3, is carried out.

At this point, a radially internal portion of the green tyre on the toroidal support is vulcanised at least partially by pressing by means of the pressurised secondary work fluid the radially internal surface of the green tyre towards the external surface of the toroidal support and supplying heat to said portion, preferably by supplying the pressurised primary work fluid inside the toroidal support. It is to be noted that, as shown in WO 2004/045837, in the solution preferred by the Applicant, the secondary working fluid, being adapted to press the radially internal surface of the tyre towards the external surface of the toroidal support, is supplied with a pressure greater than the supply pressure of the primary working fluid, which, during this step is adapted to supply the heat necessary for the aforesaid prevulcanisation.

Afterwards, the tyre molding step is carried out, by disconnecting the supply of the pressurised secondary fluid which is evacuated from the mold, continuing with the single supply of the pressurised primary working fluid inside the toroidal support so as to press the radially external surface of the green tyre towards the internal walls of the vulcanisation mold 4, taking place the step of real vulcanisation.

In a following step, the supplying devices of the pressurised primary working fluid and the supplying device of the pressurised secondary working fluid are disconnected from the vulcanisation mold 4 which is transferred to a vulcanisation station 3'.

In this vulcanisation station 3', a supplying device of the pressurised primary working fluid is connected to the vulcanisation mold 4 and therefore the vulcanisation of the tyre, previously prevulcanised and molded, is completed by supplying heat to the tyre through the pressurised primary working fluid supplied inside the toroidal support. In this step the primary working fluid continues to press the radially external surface of the green tyre towards the internal walls of the vulcanisation mold 4.

At this point, it may be accomplished a step of transferring the vulcanisation mold 4 to a loading and unloading station 3", which can be integrated in the prevulcanisation and molding station 3, followed by the opening of the vulcanisation mold 4 for the unloading of the molded and vulcanised tyre.

As mentioned previously, the opening of the vulcanisation molds is preferably carried out by mold opening and closing devices which may be optionally integrated in said prevulcanisation and molding station 3, and which cooperate with the aforesaid moving devices 6 so that when the vulcanisation mold 4 is opened, the moving devices 6 pick up the vulcanised tyre arranged on the respective toroidal support from the vulcanisation module 2 and place a green tyre inside the same module in the vulcanisation mold 4.

Preferably, and in order to maximise the efficiency of the vulcanisation method according to the present invention, the actual vulcanisation step has a duration that substantially coincides with a multiple time of the duration of the prevulcanisation and molding step. In particular, indicating with t1 the total time required for carrying out the following steps:

h) connecting the supplying device of the pressurised primary work fluid to the vulcanisation mold 4 in the vulcanisation station 3';

i) completing the vulcanisation of the molded and prevulcanised tyre by supplying the pressurised primary work fluid inside the toroidal support and pressing a radially external surface of the green tyre towards the internal walls of the vulcanisation mold 4;

j) disconnecting the supplying device of the pressurised primary work fluid;

and indicating with t2 the total time required for carrying out the following steps:

k) opening the vulcanisation mold 4 and unloading the molded and vulcanised tyre from the same vulcanisation mold 4;

a) placing a green tyre, arranged on a respective toroidal support, inside a vulcanisation mold 4 which may be operably associated with the work stations in the vulcanisation module 2;

b) closing the vulcanisation mold 4;

c) connecting the supplying device of the heated pressurised primary work and the supplying device of the pressurised secondary work fluid to the vulcanisation mold 4 in the prevulcanisation and molding station 3;

d) at least partially vulcanising a radially internal portion of the green tyre on the toroidal support pressing by means of said pressurised secondary work fluid a radially internal surface of said green tyre towards an external surface of the toroidal support, and supplying heat to said portion by supplying the pressurised primary work fluid inside the toroidal support;

e) molding and continuing the vulcanisation of the aforesaid tyre by supplying the pressurised primary work fluid inside the toroidal support pressing a radially external surface of the green tyre towards the internal walls of the vulcanisation mold 4;

f) disconnecting from the vulcanisation mold 4, the supplying device of the pressurised primary work fluid and the supplying device of the pressurised secondary work fluid;

the present invention provides that in a preferred embodiment, t1 is substantially equal to m*t2 where m is a whole number greater than or equal to 1 and preferably comprised between 2 and 4.

According to some preferred embodiments, the number of the vulcanisation stations 3' for each vulcanisation module 2 is equal to m in order to have none work station stopped at any time, and in order to obtain the maximum performance from the vulcanisation method and apparatus.

In other words, considering that the total vulcanisation time of a tyre is generally comprised between 18 and 30 minutes, and estimating therefore an average total time of 24 minutes, it is possible to estimate a time t2 equal to 8 minutes, m equal to 2, and therefore a time t1 equal to 16 minutes. In this case, in order to obtain the maximum utilisation degree of the apparatus and method, according to the present invention, it is necessary to plan for each vulcanisation module 2 of the type shown in the FIGS. 1, 2 and 3, a prevulcanisation and molding station 3 and two vulcanisation stations 3', that is the embodiment shown in FIG. 2. In fact, in this case, when the steps k), a), b), c), d), e) and f) are carried out within a time t2 equal to 8 minutes in the prevulcanisation and molding station 3, the vulcanisation mold 4 is transferred to the vulcanisation station 3' where the steps h), i) and j) are carried out in a time t1 equal to 16 minutes. Therefore it is possible to repeat in this time the steps k), a) and b) in the prevulcanisation station 3 with a new mold 4 which will then be transferred to the second vulcanisation station 3'. In the mean time the vulcanisation of the tyre housed in the first mold 4 in the first vulcanisation station 3' will be completed. Said first mold 4 will therefore be transferred to station 3 for the unloading thus leaving the station 3' free and ready for a third vulcanisation mold.

In this manner, all the various steps of the method are carried out in the work stations substantially simultaneously, thus obtaining the maximum utilisation degree of the apparatus and the method according to the present invention, considerably reducing the dead times in each of the work stations.

In the case wherein m is equal to 1, the stop time of the vulcanisation mold 4 in the prevulcanisation and molding station 3 is substantially equal to its stop time in the vulcanisation station 3' and it is sufficient to provide a single prevulcanisation station 3 and a single vulcanisation station 3' in each vulcanisation module 2, as shown in FIG. 1.

In this case, it is appropriate to plan different forward and return paths between the prevulcanisation and molding station 3 and the vulcanisation station 3' to optimise the organisation of each vulcanisation module 2 which can be summarised as follows.

Supposing that the two molds 4 are initially unloaded, the moving device 6, for example in the form of a robotised arm, will cooperate with the mold opening and closing device to load a first green tyre in a first mold positioned in the prevulcanisation and molding station 3. The mold is closed and the steps of prevulcanisation, molding and starting the vulcanisation are carried out as described previously. When the time t2 is completed, the first mold will be moved by the transfer device 5 towards the vulcanisation station 3' where the vulcanisation will be completed, while the second mold present in this station is moved by the same transfer device 5 towards the prevulcanisation and molding station 3. Here, a second tyre is loaded into the second mold to start its own prevulcanisation, molding and starting vulcanisation step. When it is completed, in the hypothesised case (m=1), the first tyre has completed its vulcanisation, and therefore the second mold is moved to the vulcanisation station 3', the first mold is brought back to the prevulcanisation and molding station 3, where the first tyre is extracted, while a third tyre is placed inside the first mold. The vulcanisation module 2 therefore continues its own steps of controlling operative mode steps, within the scope of the vulcanisation method, as described above.

It should be noted that the operational organisation described for each vulcanisation module 2 is provided simply as an example for manufacturing running conditions. In fact, different manufacture needs, such as the changing of one or more molds, would involve some procedure variations in the sequences described which however would not modify in any way the vulcanisation method according to the invention.

In the case wherein m is equal to 2, with reference to the vulcanisation module 2 of FIG. 2, according to the description above, it is possible to resume the controlling operative modes, in the scope of the present vulcanisation method, as follows.

Supposing that the three molds 4 are initially unloaded, the moving device 6, for example in the form of a robotised arm, will cooperate with the mold opening and closing device to load a first green tyre in a first mold positioned in the prevulcanisation and molding station 3. The mold is closed and as described previously, the steps of prevulcanisation, molding and starting the vulcanisation are carried out. When the time t2 is completed, the first mold is moved by the transfer device 5 towards the first vulcanisation station 3' where the vulcanisation is completed, while a second mold arriving therefrom is moved by the same transfer device 5, for example on a parallel path, towards the prevulcanisation and molding station 3. Here, a second tyre is loaded into a second mold to start its own prevulcanisation, molding and starting vulcanisation step. When this operation is completed, after a further time lapse t2, the second mold is moved by the transfer device 5 towards a second vulcanisation station 3' where the vulcanisation is completed, while a third mold arriving therefrom is moved by the same transfer device 5 for example on a parallel path, towards the prevulcanisation and molding station 3. A third tyre is then loaded on said third mold to start its prevulcanisation, molding and starting vulcanisation step. When this is completed after a further time lapse t2, the third mold is moved by the transfer device 5 towards the first vulcanisation station 3' where it completes its vulcanisation, while the first mold arriving therefrom, when the vulcanisation step is completed (in fact, for the hypothesis made t1=2*t2) is moved towards the prevulcanisation and molding station 3. Here the mold opening and closing device collaborating with the moving device 6 extracts the first vulcanised tyre and inserts a fourth tyre to be vulcanised. The vulcanisation module 2 therefore continues its own controlling operative mode steps, within the scope of the present vulcanisation method, as described above.

It should be noted that the operational organisation here described for each vulcanisation module 2 is provided simply as an example for manufacture running conditions. In fact, different manufacture needs, such as the changing of one or more molds, would involve some procedure variations in the sequences described, which however, would not modify the vulcanisation method according to the invention in any way.

In the case wherein m is equal to 3, the controlling operative modes of the vulcanisation module 2 shown in FIG. 3 in the vulcanisation method are substantially the same as those described above.

Preferably, the stop time of a vulcanisation mold in each work station is comprised between 9 and 15 minutes, but obviously it will vary according to the type and size of the tyre to be vulcanised.

With reference to FIG. 4, according to the description above, the controlling operative modes of each vulcanisation module 2 of the vulcanisation apparatus 1, in the vulcanisation method described above, can be summarised as follows. At the beginning of the vulcanisation method there are, for example, six empty molds 4, each one in a respective work station. The transfer device 6, for example in the form of a rotating arm, picks up a first mold from a first prevulcanisation station 3 moving it to the loading and unloading station 3". The moving device 6, for example, in the form of a robotised arm, cooperates with the loading and unloading station 3" inserting into said first mold in open modality, a green tyre built on a respective toroidal support. The first mold is closed and then the rotating arm moves said first mold containing the green tyre to the prevulcanisation and molding station 3 from where it was taken previously. Here, according to the description above, the prevulcanisation, molding and starting vulcanisation steps are carried out. Meanwhile a second mold taken from the second prevulcanisation and molding station 3, is transported to the loading and unloading station 3", where a second green tyre is placed thereinside by the robotised arm. Also this second mold is picked up by the rotating arm to be moved back to the second prevulcanisation and molding station 3 from where it was picked up previously. Meanwhile a third mold is picked up from a first vulcanisation station 3' and taken to the loading and unloading station 3" to receive the third green tyre. Once the prevulcanisation and molding has been completed in the first mold, this is transferred by the rotating arm to the first vulcanisation station 3' which has just been vacated, and here the first tyre completes its vulcanisation cycle according to the modalities described above. Meanwhile the third mold is placed in the first prevulcanisation and molding station 3 vacated by the first mold, to carry out the prevulcanisation, molding and starting vulcanisation steps. A fourth mold is transferred from the second vulcanisation station 3' to the loading and unloading station 3" and then, the second mold, having completed the prevulcanisation, molding and starting vulcanisation step, is moved to the second vulcanisation station 3', vacated by the fourth mold, to complete the vulcanisation step. Proceeding in an analogous manner two other green tyres are loaded on a fifth and sixth mold, and then the corresponding prevulcanisation, molding and starting vulcanisation steps in the respective first and second prevulcanisation and molding stations 3, while the third and fourth molds, having completed the prevulcanisation, molding and starting vulcanisation steps, reach the third and fourth vulcanisation stations 3' vacated by the fifth and sixth molds respectively. Therefore in this condition, there are six loaded molds, four of which are undergoing vulcanisation while two are undergoing prevulcanisation, molding and starting vulcanisation. When the first mold has completed the vulcanisation step, it is moved to the loading and unloading station 3". Said first mold is then opened and the first vulcanised tyre is picked up by the robotised arm and transferred to an area, not shown, where it is removed from its toroidal support. Meanwhile the fifth mold is transferred to the first vulcanisation station 3' vacated by the first mold in order to continue its vulcanisation cycle. Therefore the first mold receives a seventh tyre and will begin a new prevulcanisation, molding and starting vulcanisation in the first prevulcanisation and molding station 3 vacated by the fifth mold. The second mold, having completed its vulcanisation step, vacates the second vulcanisation station 3' which is then occupied by the sixth mold, which vacates the second prevulcanisation and molding station 3. A second tyre is then extracted from the second mold and an eighth tyre is placed thereinside to begin the cycle again in the second prevulcanisation and molding station 3 vacated by the sixth mold. The controlling operative modes of vulcanisation module 2, in the vulcanisation method, therefore continue as described above. At the same time, also the other vulcanisation module 2 vulcanises analogously the green tyres sent thereto.

It should be noted that the operational organisation here described for each vulcanisation module 2 is provided simply as an example for manufacture running conditions. In fact, different manufacture needs, such as the changing of one or more molds, would involve some procedure variations in the sequences described, which however, would not modify the vulcanisation method according to the invention in any way.

In the scope of the present above description and in the following claims, all the numerical measurements indicating quantity, parameters, percentages, etc, are to be considered as preceded by the term "about" unless specified otherwise. Moreover, all the intervals of numerical measurement include all possible combinations of maximum and minimum numerical value, as well as all the possible intermediate intervals, other than those specifically indicated in the text.

The invention claimed is:

1. A vulcanisation method for tyres for vehicle wheels comprising the following steps:
   a) placing a first green tyre, arranged on a first torodial support, inside a first vulcanisation mold which may be operably associated with a plurality of work stations defined in at least one vulcanisation module, the at least one vulcanisation module including at least one prevulcanisation and molding station and at least two vulcanisation stations, the at least two vulcanisation stations further including a first vulcanisation station, and a second vulcanisation station;
   b) closing said first vulcanisation mold;
   c) connecting a supply device of at least one pressurised primary working fluid and a supply device of at least one pressurised secondary working fluid to the first vulcanisation mold in the prevulcanisation and molding station;
   d) at least partially vulcanising a radially internal portion of he first green tyre on the first toroidal support in the first vulcanisation mold at the prevulcanisation and molding station by pressing said at least one pressurised secondary working fluid on a radially internal surface of said first green tyre toward an external surface of the first toroidal support, and supplying heat to said portion of the first tyre;
   e) molding and continuing the vulcanisation of the first tyre by supplying the at least one pressurised primary working fluid inside the first toroidal support pressing a radially external surface of the first green tyre toward the internal walls of the first vulcanisation mold;
   f) disconnecting the supply device of said at least one pressurised primary working fluid and the supply device of said at least one pressurised secondary working fluid from the first vulcanisation mold;
   g) transferring the first vulcanisation mold from the prevulcanisation and molding station to the first vulcanisation station;
   h) connecting a respective supply device of at least one pressurised primary working fluid to the first vulcanisation mold in said first vulcanisation station;
   i) at the first vulcanisation station, completing the vulcanisation of the first green tyre molded and prevulcanised during steps d) and e), including supplying said at least one pressurised primary working fluid inside the first toroidal support, pressing a radially external surface of the first green tyre toward the internal walls of the first vulcanisation mold, and supplying heat to the first tyre;
   j) disconnecting the supply device of said at least one pressurised primary working fluid from the first vulcanisation mold;
   k) opening the first vulcanisation mold and unloading the molded and vulcanised first tyre from the first vulcanisation mold;
   l) placing a second green tyre, arranged on a second torodial support, inside a second vulcanisation mold which may be operably associated with the plurality of work stations defined in the at least one vulcanisation module;
   m) closing the second vulcanisation mold;
   n) connecting the supply device of the at least one pressurised primary working fluid and the supply device of the at least one pressurised secondary working fluid to the second vulcanisation mold in the prevulcanisation and molding station;
   o) at least partially vulcanising a radially internal portion of the second green tyre on the second toroidal support in the second vulcanisation mold at the prevulcanisation and molding station by pressing said at least one pressurised secondary working fluid on a radially internal surface of said second green tyre toward an external surface of the second toroidal support, and supplying heat to said portion of the second green tyre;
   p) molding and continuing the vulcanisation of the second green tyre by supplying the at least one pressurised primary working fluid inside the second toroidal support pressing a radially external surface of the second green tyre toward the internal walls of the second vulcanisation mold;
   q) disconnecting the supply device of said at least one pressurised primary working fluid and the supply device of said at least one pressurised secondary working fluid from the second vulcanisation mold;
   r) connecting a second respective supply device of at least one pressurised primary working fluid to the second vulcanisation mold in said second vulcanisation station;
   s) at the second vulcanisation station, completing the vulcanisation of the second green tyre molded and prevulcanised during steps o) and p), including supplying said at least one pressurised primary working fluid inside the second toroidal support, pressing a radially external surface of the second green tyre toward the internal walls of the second vulcanisation mold and supplying heat to the second green tyre;

t) disconnecting the supply device of said at least one pressurised primary working fluid from the second vulcanisation mold;

u) opening the second vulcanisation mold and unloading the molded and vulcanised second tyre from the second vulcanisation mold;

wherein processing the first and second green tires at the first and second vulcanisation stations includes stopping each of the first vulcanisation mold and the second vulcanisation mold in the first vulcanisation station and the second vulcanisation station, respectively, for a period of time substantially equal to a multiple m of the time the first and second vulcanisation molds stop in the prevulcanisation and molding station, m being an integer greater than 1;

wherein the pressure of the primary working fluid inside the first toroidal support immediately prior to step f) and immediately after step f) remains unchanged;

wherein the pressure of the primary working fluid inside the first toroidal support immediately prior to step q) and immediately after step q) remains unchanged;

wherein step n) is performed after step c); and wherein said prevulcanisation and molding station, first vulcanization station, and second vulcanization stations are substantially immoveable stations.

2. The vulcanisation method for tyres for vehicle wheels according to claim 1, wherein step k) of opening the first vulcanisation mold and unloading the first tyre, is carried out at a work station provided with at least one mold opening and closing device.

3. The vulcanisation method for tyres for vehicle wheels according to claim 2, wherein said mold opening and closing device is integrated in said prevulcanisation and molding station.

4. The vulcanisation method for tyres for vehicle wheels according to claim 2, wherein said mold opening and closing device is integrated in a specific loading and unloading station.

5. The vulcanisation method according to claim 1, wherein the heat supplied to said radially internal portion of the first green tyre in step d) of partial vulcanisation is supplied by said at least one pressurised primary work fluid supplied into said first or second toroidal support.

6. The vulcanisation method according to claim 1, wherein the heat supplied to said first green tyre in vulcanisation step i), is supplied by feeding said at least one heated pressurised primary work fluid inside said first or second toroidal support.

7. The vulcanisation method according to claim 1, wherein the total time for carrying out steps h) +i) +j) is equal to t1, and the total time for carrying out steps k) +a) +b) +c) +d) +e) +f) is equal to t2, t1 =m*t2.

8. The vulcanisation method according to claim 7, wherein m is 2 to 4.

9. The vulcanisation method according to claim 7, wherein the first and second vulcanisation molds stops at each of the prevulcanisation and molding station and their respective first and second vulcanisation stations for a stop time of about 9 to about 15 minutes.

10. The vulcanisation method according to claim 1, wherein said primary working fluid comprises steam.

11. The vulcanisation method according to claim 1, wherein said primary working fluid comprises an inert gas.

12. The vulcanisation method according to claim 1, wherein said secondary working fluid comprises an inert gas.

13. The vulcanisation method according to claim 1, wherein the at least one vulcanisation module includes at least two vulcanisation stations for each prevulcanisation and molding station.

14. The vulcanisation method according to claim 1, wherein the first vulcanisation mold is transferred from the prevulcanisation and molding station to the first vulcanisation station by at least one rotating arm.

15. The vulcanisation method according to claim 1, wherein the second vulcanisation mold is transferred from the prevulcanisation and molding station to the second vulcanisation station by at least one rotating arm.

16. A vulcanisation method for tyres for vehicle wheels comprising the following steps:

a) placing a first green tyre, arranged on a first torodial support, inside a first vulcanisation mold which may be operably associated with a plurality of work stations defined in at least one vulcanisation module;

b) closing said first vulcanisation mold;

c) connecting a supply device of at least one pressurised primary working fluid and a supply device of at least one pressurised secondary working fluid to the first vulcanisation mold in a prevulcanisation and molding station;

d) at least partially vulcanising a radially internal portion of the first green tyre on the first toroidal support in the first vulcanisation mold at the prevulcanisation and molding station by pressing said at least one pressurised secondary working fluid on a radially internal surface of said first green tyre toward an external surface of the first toroidal support, and supplying heat to said portion of the first tyre;

e) molding and continuing the vulcanisation of the first tyre by supplying the at least one pressurised primary working fluid inside the first toroidal support pressing a radially external surface of the first green tyre toward the internal walls of the first vulcanisation mold;

f) disconnecting the supply device of said at least one pressurised primary working fluid and the supply device of said at least one pressurised secondary working fluid from the first vulcanisation mold;

g) transferring the first vulcanisation mold from the prevulcanisation and molding station to a first vulcanisation station;

h) connecting a respective supply device of at least one pressurised primary working fluid to the first vulcanisation mold in said first vulcanisation station;

i) at the first vulcanisation station, completing the vulcanisation of the first green tyre molded and prevulcanised during steps d) and e), including supplying said at least one pressurised primary working fluid inside the first toroidal support, pressing a radially external surface of the first green tyre toward the internal walls of the first vulcanisation mold, and supplying heat to the first tyre;

j) disconnecting the supply device of said at least one pressurised primary working fluid from the first vulcanisation mold;

k) opening the first vulcanisation mold and unloading the molded and vulcanised first tyre from the first vulcanisation mold;

l) placing a second green tyre, arranged on a second torodial support, inside a second vulcanisation mold which may be operably associated with the plurality of work stations defined in the at least one vulcanisation module;

m) closing the second vulcanisation mold;

n) connecting the supply device of the at least one pressurised primary working fluid and the supply device of the at least one pressurised secondary working fluid to the second vulcanisation mold in the prevulcanisation and molding station;

o) at least partially vulcanising a radially internal portion of the second green tyre on the second toroidal support in the second vulcanisation mold at the prevulcanisation and molding station by pressing said at least one pressurised secondary working fluid on a radially internal surface of said second green tyre toward an external surface of the second toroidal support, and supplying heat to said portion of the second green tyre;

p) molding and continuing the vulcanisation of the second green tyre by supplying the at least one pressurised primary working fluid inside the second toroidal support pressing a radially external surface of the second green tyre toward the internal walls of the second vulcanisation mold;

q) disconnecting the supply device of said at least one pressurised primary working fluid and the supply device of said at least one pressurised secondary working fluid from the second vulcanisation mold;

r) connecting a second respective supply device of at least one pressurised primary working fluid to the second vulcanisation mold in a second vulcanisation station;

s) at the second vulcanisation station, completing the vulcanisation of the second green tyre molded and prevulcanised during steps o) and p), including supplying said at least one pressurised primary working fluid inside the second toroidal support, pressing a radially external surface of the second green tyre toward the internal walls of the second vulcanisation mold and supplying heat to the second green tyre;

t) disconnecting the supply device of said at least one pressurised primary working fluid from the second vulcanisation mold;

u) opening the second vulcanisation mold and unloading the molded and vulcanised second tyre from the second vulcanisation mold;

wherein processing the first and second green tires at the first and second vulcanisation stations includes stopping each of the first vulcanisation mold and the second vulcanisation mold in the first vulcanisation station and the second vulcanisation station, respectively, for a period of time substantially equal to a multiple m of the time the first and second vulcanisation molds stop in the prevulcanisation and molding station, m being an integer greater than 1;

wherein step n) is performed after step c);

wherein the first vulcanisation mold is transferred from the prevulcanisation and molding station to the first vulcanisation station by at least one rotating arm; and wherein said prevulcanisation and molding station, first vulcanization station and second vulcanization stations are substantially immoveable stations.

17. The vulcanisation method according to claim 16, wherein the second vulcanisation mold is transferred from the prevulcanisation and molding station to the second vulcanisation station by the at least one rotating arm.

18. The vulcanisation method for tyres for vehicle wheels according to claim 16, wherein step k) of opening the first vulcanisation mold and unloading the first tyre, is carried out at a work station provided with at least one mold opening and closing device.

19. The vulcanisation method for tyres for vehicle wheels according to claim 18, wherein said mold opening and closing device is integrated in said prevulcanisation and molding station.

20. The vulcanisation method for tyres for vehicle wheels according to claim 18, wherein said mold opening and closing device is integrated in a specific loading and unloading station.

21. The vulcanisation method according to claim 16, wherein the heat supplied to said radially internal portion of the first green tyre in step d) of partial vulcanisation is supplied by said at least one pressurised primary work fluid supplied into said first or second toroidal support.

22. The vulcanisation method according to claim 16, wherein the heat supplied to said first green tyre in vulcanisation step i), is supplied by feeding said at least one heated pressurised primary work fluid inside said first or second toroidal support.

23. The vulcanisation method according to claim 16, wherein the total time for carrying out steps h) +i) +j) is equal to t1, and the total time for carrying out steps k) +a) +b) +c) +d) +e) +f) is equal to t2, t1 =m*t2.

24. The vulcanisation method according to claim 23, wherein m is 2 to 4.

25. The vulcanisation method according to claim 23, wherein the first and second vulcanisation molds stops at each of the prevulcanisation and molding station and their respective first and second vulcanisation stations for a stop time of about 9 to about 15 minutes.

26. The vulcanisation method according to claim 16, wherein said primary working fluid comprises steam.

27. The vulcanisation method according to claim 16, wherein said primary working fluid comprises an inert gas.

28. The vulcanisation method according to claim 16, wherein said secondary working fluid comprises an inert gas.

29. A vulcanisation method for tyres for vehicle wheels comprising the following steps:
a) placing a first green tyre, arranged on a first torodial support, inside a first vulcanisation mold which may be operably associated with a plurality of work stations defined in at least one vulcanisation module;
b) closing said first vulcanisation mold;
c) connecting a supply device of at least one pressurised primary working fluid and a supply device of at least one pressurised secondary working fluid to the first vulcanisation mold in a prevulcanisation and molding station;
d) at least partially vulcanising a radially internal portion of the first green tyre on the first toroidal support in the first vulcanisation mold at the prevulcanisation and molding station by pressing said at least one pressurised secondary working fluid on a radially internal surface of said first green tyre toward an external surface of the first toroidal support, and supplying heat to said portion of the first tyre;
e) molding and continuing the vulcanisation of the first tyre by supplying the at least one pressurised primary working fluid inside the first toroidal support pressing a radially external surface of the first green tyre toward the internal walls of the first vulcanisation mold;
f) disconnecting the supply device of said at least one pressurised primary working fluid and the supply device of said at least one pressurised secondary working fluid from the first vulcanisation mold:
g) transferring the first vulcanisation mold from the prevulcanisation and molding station to a first vulcanisation station;
h) connecting a respective supply device of at least one pressurised primary working fluid to the first vulcanisation mold in said first vulcanisation station;
i) at the first vulcanisation station, completing the vulcanisation of the first green tyre molded and prevulcanised during steps d) and e), including supplying said at least one pressurised primary working fluid inside the first toroidal support, pressing a radially external surface of the first green tyre toward the internal walls of the first vulcanisation mold, and supplying heat to the first tyre;

j) disconnecting the supply device of said at least one pressurised primary working fluid from the first vulcanisation mold;

k) opening the first vulcanisation mold and unloading the molded and vulcanised first tyre from the first vulcanisation mold;

l) placing a second green tyre, arranged on a second toroidal support, inside a second vulcanisation mold which may be operably associated with a plurality of work stations defined in the at least one vulcanisation module;

m) closing the second vulcanisation mold;

n) connecting the supply device of the at least one pressurised primary working fluid and the supply device of the at least one pressurised secondary working fluid to the second vulcanisation mold in the prevulcanisation and molding station;

o) at least partially vulcanising a radially internal portion of the second green tyre on the second toroidal support in the second vulcanisation mold at the prevulcanisation and molding station by pressing said at least one pressurised secondary working fluid on a radially internal surface of said second green tyre toward an external surface of the second toroidal support, and supplying heat to said portion of the second green tyre;

p) molding and continuing the vulcanisation of the second green tyre by supplying the at least one pressurised primary working fluid inside the second toroidal support pressing a radially external surface of the second green tyre toward the internal walls of the second vulcanisation mold;

q) disconnecting the supply device of said at least one pressurised primary working fluid and the supply device of said at least one pressurised secondary working fluid from a second vulcanisation mold;

r) connecting a second respective supply device of at least one pressurised primary working fluid to a second vulcanisation mold in said second vulcanisation station;

s) at the second vulcanisation station, completing the vulcanisation of the second green tyre molded and prevulcanised during steps o) and p), including supplying said at least one pressurised primary working fluid inside the second toroidal support, pressing a radially external surface of the second green tyre toward the internal walls of the second vulcanisation mold and supplying heat to the second green tyre;

t) disconnecting the supply device of said at least one pressurised primary working fluid from the second vulcanisation mold;

u) opening the second vulcanisation mold and unloading the molded and vulcanised second tyre from the second vulcanisation mold;

wherein processing the first and second green tires at the first and second vulcanisation stations includes stopping each of the first vulcanisation mold and the second vulcanisation mold in the first vulcanisation station and the second vulcanisation station, respectively, for a period of time substantially equal to a multiple m of the time the first and second vulcanisation molds stop in the prevulcanisation and molding station, m being an integer greater than 1;

wherein step n) is performed after step c);

wherein the prevulcanisation and molding station is configured to receive both the supply device of the at least one pressurised primary working fluid and the supply device of the at least one pressurised secondary working fluid, and the first vulcanisation station is configured to receive only the respective supply device of the at least one pressurised primary working fluid, and the second vulcanisation station is configured to receive only the second respective supply device of the at least one pressurised primary working fluid; and wherein said prevulcanisation and molding station, first vulcanization station, and second vulcanization stations are substantially immoveable stations.

30. The vulcanisation method according to claim 29, wherein the second vulcanisation mold is transferred from the prevulcanisation and molding station to the second vulcanisation station by the at least one rotating arm.

31. The vulcanisation method for tyres for vehicle wheels according to claim 29, wherein step k) of opening the first vulcanisation mold and unloading the first tyre, is carried out at a work station provided with at least one mold opening and closing device.

32. The vulcanisation method for tyres for vehicle wheels according to claim 31, wherein said mold opening and closing device is integrated in said prevulcanisation and molding station.

33. The vulcanisation method for tyres for vehicle wheels according to claim 31, wherein said mold opening and closing device is integrated in a specific loading and unloading station.

34. The vulcanisation method according to claim 29, wherein the heat supplied to said radially internal portion of the first green tyre in step d) of partial vulcanisation is supplied by said at least one pressurised primary work fluid supplied in to said first or second toroidal support.

35. The vulcanisation method according to claim 29, wherein the heat supplied to said first green tyre in vulcanisation step i), is supplied by feeding said at least one heated pressurised primary work fluid inside said first or second toroidal support.

36. The vulcanisation method according to claim 29, wherein the total time for carrying out steps h) +i) +j) is equal to t1, and the total time for carrying out steps k) +a) +b) +c) +d) +e) +f) is equal to t2, t1 =m*t2.

37. The vulcanisation method according to claim 36, wherein m is 2 to 4.

38. The vulcanisation method according to claim 36, wherein the first and second vulcanisation molds stops at each of the prevulcanisation and molding station and their respective first and second vulcanisation stations for a stop time of about 9 to about 15 minutes.

39. The vulcanisation method according to claim 29, wherein said primary working fluid comprises steam.

40. The vulcanisation method according to claim 29, wherein said primary working fluid comprises an inert gas.

41. The vulcanisation method according to claim 29, wherein said secondary working fluid comprises an inert gas.

42. The vulcanisation method according to claim 29, wherein the first vulcanisation mold is transferred from the prevulcanisation and molding station to the first vulcanisation station by at least one rotating arm.

* * * * *